United States Patent
Durst et al.

(10) Patent No.: US 7,666,367 B1
(45) Date of Patent: Feb. 23, 2010

(54) METHOD FOR A BURNER AND A CORRESPONDING DEVICE

(75) Inventors: Franz Durst, Langensendelbach (DE); Jürgen Künzel, Thierhaupten (DE)

(73) Assignee: SGL Carbon AG (DE)

( * ) Notice: Subject to any disclaimer, the term of this patent is extended or adjusted under 35 U.S.C. 154(b) by 268 days.

(21) Appl. No.: 10/069,261

(22) PCT Filed: Jul. 3, 2000

(86) PCT No.: PCT/EP00/06199

§ 371 (c)(1),
(2), (4) Date: Aug. 12, 2002

(87) PCT Pub. No.: WO01/14249

PCT Pub. Date: Mar. 1, 2001

(30) Foreign Application Priority Data

Aug. 23, 1999 (DE) .................. 199 39 951

(51) Int. Cl.
*B01J 19/00* (2006.01)
*F23D 14/02* (2006.01)
*F23D 14/12* (2006.01)

(52) U.S. Cl. .................. 422/220; 422/211; 422/224; 422/234; 422/240; 431/115; 431/326; 431/346; 431/354

(58) Field of Classification Search .............. 431/1, 431/7, 8, 10, 12, 173, 326, 170, 115; 422/198, 422/234

See application file for complete search history.

(56) References Cited

U.S. PATENT DOCUMENTS

| | | | |
|---|---|---|---|
| 1,846,978 A * | 2/1932 | Parker et al. ............. 431/4 |
| 2,087,031 A * | 7/1937 | Hays ...................... 122/158 |
| 3,220,798 A * | 11/1965 | Cull et al. ............... 423/486 |
| 3,982,878 A * | 9/1976 | Yamane et al. ............. 431/2 |
| 4,468,376 A | 8/1984 | Suggitt .................. 588/316 |
| 4,778,485 A | 10/1988 | Suggitt et al. ............ 48/197 R |
| 5,110,563 A * | 5/1992 | Noakes et al. ............ 422/191 |
| 5,165,884 A * | 11/1992 | Martin et al. ............. 431/7 |
| 5,334,012 A * | 8/1994 | Brock et al. ............. 432/106 |
| 5,388,985 A | 2/1995 | Musil et al. ............. 431/116 |
| 5,522,723 A * | 6/1996 | Durst et al. ............. 431/328 |

(Continued)

FOREIGN PATENT DOCUMENTS

BE 647753 8/1964

(Continued)

*Primary Examiner*—Jennifer A Leung
(74) *Attorney, Agent, or Firm*—Fay Sharpe LLP (57) ABSTRACT

The invention relates to a device equipped with a burner for combusting a fuel/oxidant mixture inside a combustion chamber in which a material (3, 3', 3", 3''') is provided that endures a maximum temperature. The inventive device also comprises one or more supply lines (25, 26) for the fuel as well as for the oxidant which are provided for supplying the same into the combustion chamber. The inventive device is characterized in that it is designed for carrying out a combustion with a combustion temperature of the fuel/oxidant mixture that exceeds the maximum temperature. The device is designed in such a way that at least one additional supply line (30) is provided via which an additional gas having, in particular, a low calorific value can be supplied to the combustion chamber. Said additional gas enables the temperature during combustion to be lowered to a value that is less than the maximum temperature.

28 Claims, 7 Drawing Sheets

U.S. PATENT DOCUMENTS 5,616,021 A * 4/1997 Onimaru et al. ............. 431/115
6,053,962 A * 4/2000 Ariyama et al. ............... 75/573
6,063,348 A * 5/2000 Hinke et al. ................ 423/235

FOREIGN PATENT DOCUMENTS

| | | | |
|---|---|---|---|
| EP | 0 657 011 B1 | | 1/1995 |
| GB | 2159137 A | * | 11/1985 |
| JP | 01305288 | | 12/1989 |
| JP | 10103617 | | 4/1998 |

* cited by examiner

METHOD FOR A BURNER AND A CORRESPONDING DEVICE

FIELD OF INVENTION

The invention relates to a method for a burner for combustion of a fuel/oxidant mixture within a combustion chamber, in which a material is provided which endures a maximum temperature, said temperature being lower than the combustion temperature of the fuel/oxidant mixture. The invention further relates to a device with a burner for combustion of a fuel/oxidant mixture within a combustion chamber, in which a material is provided which endures a maximum temperature, with one or several supply lines for the fuel and for the oxidant, in order to introduce these into the combustion chamber. In addition, the invention relates to applications for the method and/or applications of the device.

BACKGROUND OF INVENTION

It is the goal of most burner applications to attain, among others, the most effective combustion possible in order to achieve the maximum degree of efficiency. However, the temperature limit is usually restricted by the temperature resistance of the available burner material.

Temperatures higher than permitted by the available materials occur in particular with strong exothermal chemical reaction, such as during the synthesis of intermediate or end products. Such chemical reactions are frequently performed with freely burning flame, which burns far remote from the combustion material.

In addition, with these exothermal chemical reactions there exist, depending upon the properties of the employed materials, specifically designed reactors comprising one or several burner units and a combustion chamber. Since, however, the employed materials and the products frequently present highly toxic and corrosive properties, such reactors must be designed according to particularly strict safety requirements, which constitutes significant limitation with respect to the selection of material.

The following description deals mainly with synthesis of hydrochloric acid, in which chlorine and hydrogen are reacted with each other. If mention is frequently made is this text of the synthesis of hydrochloric acid, it is not intended to be limitative but only exemplary. The represented principles can be transferred to all similar reactions, in particular such reactions where high temperatures may develop.

With the synthesis of hydrochloric acid, the reaction chamber, in principle, is a diffusion flame, which is located in an expanded combustion chamber. Relatively simple devices are used as burners which are made of corrosion-resistant materials and comprise an inner and an outer pipe. The chlorine-containing gases are supplied via the inner pipe, which frequently presents a specifically designed burner head. The hydrogen-containing gases, however, are introduced through a free annular gap between the pipes, so that the hydrogen practically envelopes the chlorine-containing gases. The two gases only come into contact directly after exit from the burner, they react with each other and form a long flame which expands in the combustion chamber.

Thorough mixing of the reactants in the flame takes mainly place by diffusion. Because of the high combustion temperatures, the walls of the combustion chamber need to be away as far as possible. In addition, these walls are cooled in most instances.

This, however, produces a great disadvantage with this type of combustion, because the outer regions of such flame cool down to such extent from heat transfer to the cooled walls, that the conversion of the reactants takes place only slowly or comes to a stop. Under certain circumstances this results in unreacted chlorine within the formed hydrochloric acid during exit of the hot combustion gases from the combustion chamber. The percentage of the unreacted chlorine is therefore reduced by providing a hydrogen excess ranging between 5 and 10%.

It is desirable with this type of applications, in particular with synthesis of hydrochloric acid, to attain higher flame stability. The usual physical parameters for adjustment, however, are highly restricted. With under-pressure, for example, the stability of the flame declines,—its expansion clearly increases. Combustion at higher pressures, however, is not customary practice up to now. Also, specifically designed pre-mix burners cannot be employed due to the danger of flame backfire without self-ignition of the mixture of chlorine and hydrogen.

Another topic to be addressed here is the disposal of noxious gas. A customary specific embodiment of a chemical reactor for disposal of noxious matter is a hot combustion chamber lined with refractory materials, in which the combustion gases are brought to reaction with traditional burners. The noxious gases to be disposed of are passed into a combustion chamber with the aid of a separate supply line. The combustion chamber is dimensioned in such manner that a certain minimum dwell time exists with high temperature for final combustion of reaction gases. Such devices are preferably employed for after-combustion of chlorine-containing compounds or exhaust gases. The minimum dwell time generally determines the size of such combustion chambers. It is true, however, that with better mixing and more intensive heat, the size can be reduced.

The above cited discourse demonstrates that such fixtures can only be manufactured with maintenance of a certain minimum size, in other words, the fixtures usually occupy a great deal of space. For example, in the catalog of Messrs. SGL-TECHNIK GmbH. Apparatebau, Werner von Siemens Straβe 18, DE-86405 Meitingen, an HCL-Synthesis Oven is shown on page 3, from which it is apparent from the size of persons depicted in the same figure that its approximate size is over 10 m long. Said length should be able to be drastically reduced.

SUMMARY OF THE INVENTION

It is the object of the invention to improve a method and a device of the initially mentioned type in such manner that the thus developed apparatuses and/or burners occupy less space. In addition, a device is to be created for said method, by means of which it is possible for example, to perform the above-mentioned exothermal chemical reactions while lessening the drawbacks described in more detail above.

Based on the initially mentioned method, the object of the invention is solved in that prior to combustion, an additional gas is introduced, which does not significantly contribute to the combustion, such as an inert gas or water vapor or the exhaust gas from combustion or after-combustion, by means of which the temperature during combustion can be reduced to a value which is below the maximum temperature. In this respect, at least one additional supply line is provided for a device, by means of which an additional gas having an especially low combustion value, can be supplied, thus making it possible to reduce the temperature during combustion to a value below the maximum temperature.

This simple route for solving the object, namely reducing the temperature with the aid of an additional gas, initially does not appear to be particularly effective. Quite the contrary was true, however. In particular, it was demonstrated that based on the invention and its corresponding improvements, a fixture for hydrochloric acid synthesis, for example, can be manufactured having a length of less than one meter. Said result, namely drastic reduction of the length from almost 15 m to less than 1 m, should have been totally unexpected when posing the object.

With traditional measures, it also would have been practically unattainable by a person skilled in the art, that is to say, switching in parallel several low output hydrochloric acid synthesis plants in order to reduce the length.

The invention is based on the knowledge that with lowering the temperature via addition of an additional gas for cooling, the expenditure for exterior cooling is not only greatly reduced, but the distance between flame/wall can also be kept significantly shorter.

In addition, other burner types than the previously named diffusion burners can also be employed, which, likewise, facilitate further shortening. It is expected that with respect to hydrochloric acid synthesis, based on the invention, it is possible to operate with lower hydrogen excess, inasmuch as the temperature gradients which occur according to the state of the art, are significantly lower and through-mixing is better. This increases the economic efficiency of such fixtures.

In addition, there is also the benefit that based on capability to adjust the amount of the supplied inert gas, it is possible to control or regulate the temperature. This possibility can also be used, for example, to regulate the temperature of the fuel/oxidant mixtures with respect to lowest possible exhaust gas emissions.

With respect to a preferred improvement of the device, there is provision for the combustion product to be passed from the combustion chamber, at least in part, via a supply line as additional gas, by means of which the temperature can be lowered during combustion.

It is then not only possible to obtain a reduced temperature, but there also takes place after-combustion of the exhaust gases, which will, under certain circumstances, significantly reduce the noxious matter contents. In addition, it should be emphasized that no specific special gases need to be introduced into the combustion chamber, since exhaust gas will always be present. The expenditure for such a device is therefore reduced.

According to another improvement of the invention with respect to the method, provision is made for mixing, at least in part, the fuel/oxidant mixture and the additionally supplied gas in a pre-mix device, which is up-stream from the burner. A corresponding device according to this improvement is characterized in that it has a pre-mix chamber for the fuel/oxidant mixture from which said fuel/oxidant mixture flows into the combustion chamber.

As is apparent from the preceding, a premix chamber according to the state of the art is clearly not possible, since the combustion gases must be conducted separately from each other until they exit from the two pipes, since otherwise there is the risk of backfire. Also, the available materials in a chlorine acid synthesis, for example, will not withstand, in case of backfire, the contact with a flame, based on the high temperatures. The premix chamber employed according to the improvement permits significantly better through-mixing and more effective conversion of the reactants, which makes possible, for example, lowering the required hydrogen percentage in the synthesis of hydrochloric acid.

With use of traditional burners, self-ignition of the hydrochloric acid mixture in the premix chamber would also present problems. The influence of UV radiation on gas in the premix chamber can be reduced by appropriate design. UV radiation could otherwise lead to ignition in the premix chamber of the mentioned gas mixture of chlorine and hydrogen.

In particular, with beneficial refinement of the invention, provision is made that the premix chamber is designed in such manner that in the direction to the combustion chamber the proportionate component of the flow velocity of the mixture is greater in the premix chamber than the flame velocity in the combustion chamber.

As a result, the premix chamber is dimensioned in such manner that any potentially developing flame in the premix chamber will be extinguished, in case of unintentional ignition in the entire operating region, for example, during start-up.

In particular, it is possible to thereby also supply the premix chamber with the additional gas by means of which the combustion temperature can be lowered, in order to mix same with the fuel/oxidant. Thus, the additional gas is also actively mixed, thereby attaining effective cooling and uniform temperature within the flame.

According to another refinement of the invention, provision is made that the size of the lateral surface in relation to the volume of the premix chamber is selected in such manner that, if needed, it is able to accommodate the free energy from an explosion.

Here again, it is possible, with simple means, to attain a high safety standard. Another pertinent improvement is achieved in a refinement of the invention by means of cooling the premix chamber.

It should be noted that a premix chamber according to the above mentioned improvements constitutes a benefit of the invention, which had thus far been excluded with other exothermal chemical reactions based on the restriction imposed by the there employed technique. To fully mix the gases in the premix chamber, the gases are blown in at high speed, preferably tangentially. The velocity of the gas mixture in axial direction is selected by means of flame velocity of the mixture. In order to improve the mixing, built-ins may be provided in the premix chamber, for example commercially available mixing elements, as employed in static mixing units.

The inventively supplied inert gas, i.e. the additional gas for lowering the flame velocity and for reducing the adiabatic combustion temperature is ad-mixed to the principal reaction gases, preferably before the premix chamber, so that it is impossible, to have significantly higher flame velocities appear at any location within the premix chamber than in the ideally pre-mixed gas mixture.

According to another beneficial improvement, provision is made for a porous material in the combustion chamber, said porous material having interconnected large hollow spaces suitable for flame development.

In particular, the porosity of the porous material with interconnected hollow spaces changes over to larger pores in the direction of flame development, resulting in a critical Péclet number for pore size at an inner border area, above which flame development takes place, and below which formation of flame is suppressed.

Embodiment possibilities for such pore burners, as they are called in the following, have been described in several articles in the technical literature, for example in Durst et al —Bulletin SEV/VSE, Volume 89, No. 21, pages 11-18, 1998. Further details may also be learned from EP0 657 011 B1. Such burners could thus far not be employed in the combustion of chemically intensive exothermal reactions, since the material could not withstand the high temperatures.

The construction size of such fixtures and devices can be significantly reduced with the use of pore burners, with equal through-put and product quality. In addition, the faulty flame stability of known fixtures and devices which occurs with pressure fluctuations and in particular with under-pressure is significantly improved.

Combustion stabilization is attained by increasing the pore size in flow direction, whereby a critical Péclet number for the pore size results in one zone of the porous material, above which there is development of flame, and below which the flame development is suppressed.

Application of said technique for preparation of chemical products, such as, for example, hydrochloric acid, or for after-combustion of noxious gases, such as, for example, chlorine-containing gases, does not only have a beneficial effect upon the combustion itself, but permits also beneficial design and arrangement of those parts of the fixture into which the pore burner is integrated.

With a pore burner, the reaction is performed within a porous matrix of temperature-resistant material. In contrast to conventional burner devices, it is not necessary to arrange the burner in a voluminous combustion chamber or to arrange same down-stream. The hot reaction products flow from the burner itself without direct flame formation.

A pore burner of the conventional design is not suitable for hydrochloric reaction or other chemical reactions utilized in the chemical industry without the inventively employed lowering of the flame temperature. Furthermore, in comparison to the known applications in heating technology, there occur significantly higher combustion chamber temperatures and the gases are highly corrosive.

Dimensioning of pore burners for industrial chemical plants is, however, initially done according to similar rules as described in Patent Specification EP 0 657 011 B1, whereby the Péclet number Pe is used as criterion for dimensioning the layered pore sizes according to the following formula:

$$Pe = \frac{S_L d_m c_p P_G}{\lambda_G}$$

with $S_L$ standing for the laminary combustion velocity of the eventually pre-mixed gases $D_m$ standing for the effective pore diameter $\lambda_f$ standing for thermal conductance of the gas mixture $P_f$ standing for the density of the gas mixture and $c_p$ standing for the specific heat capacity of the gas mixture The combustible gas mixture first flows through one region—designated in the following by Zone A, which is characterized by pore diameters of such small effect that no stationary flame expansion is possible. In other words, the first porous zone is similar in its effect to a flame backfire block. The next following combustion zone proper—hereinafter called Zone C, does however, present pore sizes which are large enough to permit stationary combustion. As criterion for flame expansion in the interior of a porous matrix is mentioned a critical Péclet number of Pe >65, according to the technical literature—for example Babkin et al, Combustion and Flame, Vol. 87, S. 182-190, 1991).

It is suggested in EP 0 657 011 B1 that a clearly lower Péclet number than Pe=65 be employed for the first zone and a clearly higher Péclet number than Pe=65 for the combustion zone.

If the pore burner is ignited, the combustion stabilizes itself at the intersection between the two zones. As a result of the small pore dimension in the first zone, there will be no combustion in said region in stationary condition but only preheating of the gas mixture. This property satisfies the strict safety requirements relative to back fire hazard in chemical plants.

Based on the excellent heat transfer between the gas- and solid body phase within the porous matrix, these are approximately in thermal equilibrium. The almost thermal equilibrium between gas- and solid body phase and the intensive intermixing within the pore body essentially causes the disappearance of free flames in the combustion zone equipped with larger pores. The combustion process now takes place in an expanded reaction region, which can more appropriately be characterized as combustion reactor than as combustion chamber with free flames.

It is possible to utilize as porous combustion chamber charge materials for pore burners of industrial chemical plants, materials such as for example aluminum oxide, circonium oxide, silicium carbide, graphite, carbon etc., which, aside from high temperature resistance, also present adequate resistance to corrosion. For preparation of the porous combustion chamber, the following are preferably employed: temperature resistant ceramic pellets in bulk volume, also shell bodies and similar bodies as they are employed, for example as random packing for thermal separation methods—even though foam structures or honeycomb structures may also be utilized. Bulk volumes are preferred because they permit simple cleaning of deposits, for example the salt residues which form during the synthesis of hydrochloric acid; said deposits originating from the combustion gases because these may, under certain circumstances, carry along salt-laden drops of fluid. According to EP 0 657 011 B1, to produce hydrochloric acid, zones of varying pore structure and/or pore size are arranged for the pore burners. This is done by utilizing filling bodies of different sizes for Zones A and C.

In deviation from the embodiment described in EP 0 657 011 B1, it is possible to arrange a grid between the porous structures formed by the filling bodies in the two zones having different pore sizes, preferably a grate, which prevents the discharge of smaller sized filling bodies from Zone A into the inter-spaces of the larger filling bodies of Zone C. At the gas exit from Zone C another gas-permeable grate is arranged for those burners where gases do not exit vertically in upward direction, said grate closes the combustion chamber. As a result it is possible to arrange the burner in any random position despite the loose bulk of filling bodies.

The porous reaction chamber is preferably encased by a corrosion-fast, cooled wall, which consists, for example, of artificial resin-impregnated graphite. Cooling can be effected by cooling water, by air or by the combustion gases themselves. Between the cooled wall and the combustion chamber is then preferably located an insolating intermediate layer of high temperature-resistant, corrosion-resistant and thermally insulating materials, which prevent loss of heat and which ensure that the specified combustion chamber temperature prevails at each location in the combustion chamber. In deviation to EP0 657 011 B1, this heavy insulation permits nearly adiabatic process control, without any temperature influence on the combustion process as a result of the cooled wall. The adiabatic process control permits, for example, simple scale-up of such chemical reactors since heat transport properties are irrelevant to the cooled walls and the entire process in flow direction can be regarded nearly one dimensional.

The adiabatic combustion temperature of several chemical reactions, as with hydrogen and chlorine reactions, lies above 2500° C. Conventional, sufficiently corrosion-resistant ceramic materials for filling the combustion chamber do not withstand these high temperatures. The proposed measure according to the invention solves the problem of the excessively high combustion chamber temperature by addition of another gas or of steam. Accordingly, another stream of gas is mixed to the combustion gas mixture in the premix chamber or to each of the combustion gases. Said gas stream may be, for example, a partial stream of the reaction product, for example, hydrochloric acid, from another part of the process-engineered facility. It is also possible to employ water vapor or another preferred inert gas with respect to the subsequent reaction, which permits lowering the combustion chamber temperature to the desired level. The lowering of the combustion temperature is all the more important since the heat supply, based on the cooled wall, plays a subordinated role for pore burners which are being dimensioned for high output. Due to the return gas and/or outside gas, the flame velocity is, additionally, lowered, so that the combustion in the entire output region can take place only in Zone C of the pore burner.

Particularly beneficial is the return of the reaction product, since the exhaust gas volume of the facility is not thereby increased. Water vapor is also beneficial in this respect, because the water vapor can be condensed several times in the down-stream devices for manufacture of end products, such as, for example, hydrochloric acid. The principal reactants like hydrogen and chlorine frequently contain—if they originate, for example, from chemical conversions in process-engineered plants—such high percentages of outside gases that an addition of further outside or return gases becomes superfluous, and/or that for technical control reasons only a certain amount needs to be added so that the reaction is stabilized at the desired temperature.

In deviation to the conventional burner designs for chemical plants, such as for hydrochloric syntheses, where the mixing of combustion gases takes place outside the burner and within the combustion chamber, the combustion gases are premixed in the here described device. In deviation from EP 0 651 011 V1, the premix chamber is preferably part of and a safety-relevant component of an inventive device.

The premix chamber is preferably made of corrosion-proof materials, for example of artificial resin impregnated graphite. The premixed gases preferably enter from the premix chamber through a grate of corrosion-resistant material, for example silicium carbide, aluminum oxide etc. into Zone A of the pore burner. As already previously addressed, several chemical reactants, such as chlorine and hydrogen tend to self-ignite under the influence of UV radiation. Self-ignition in the premix chamber, however, should be avoided for reasons of safety. A grate of suitable design and a corresponding design of Zone A is selected in such manner that from Zone A and/or Zone C no UV radiation or only very little UV radiation will get into the premix chamber, which might lead to ignition of the gas mixture of chlorine and hydrogen in the premix chamber.

The stability of the combustion with respect the described pore burner should be particularly emphasized. As opposed to the hydrochloric acid burners designed according to the state of the art, which react very sensitively to fluctuations in pressure and volume, where, in fact, the flame can easily be extinguished, the combustion reaction in the pore burner, even with short-term cut-off of one of the gases, is immediately ignited by means of the thermal capacity of the filling bodies in Zone C. For safety reasons, however, it is appropriate to also shut off the other gas when one of the gases cuts out and to undertake a subsequent inert gas rinse. Even after several minutes have elapsed, it possible to begin, without delay, operating the burner without another start-up procedure, including after inert gas rinse.

Ignition and preheating of the burner can be done with a combustion gas (hydrogen, methane etc.) and air. It is true, however, that a conventional ignition device traditionally employed for such chemical reactions may also be used for that purpose. After thorough pre-warming of Zone C, it is possible to gradually or even immediately switch over to the reactants, such as for example chlorine and hydrogen.

In case of hydrochloric acid synthesis and pre-warming with a hydrogen/air flame, beneficial regulation occurs in such fashion that the percentage of air is slowly reduced and the chlorine percentage increased in equal measure until the air is totally replaced by chlorine.

Sudden load fluctuations between 50 and 120% of nominal load, which may occur in facilities of this type can easily be handled without any difficulties with the described pore burners.

The excellent stability of the combustion reaction in the pore burner permits use of the burner under pressure or under under-pressure, which according to the state of the art has thus far not been done with sufficient process safety, based on the unstable flames, in particular in the synthesis of hydrochloric acid. For greater outputs, pore burners can be equipped with correspondingly larger cross sectional surface or can be switched in parallel in optional number. Such arrangement of many small burners significantly increases the performance range of a facility for hydrochloric acid synthesis, inasmuch as burners can be switched on or off in such an arrangement, depending upon the performance requirements. In this manner, it is possible to always run the overall configuration within optimal performance range. Likewise, contrary to the here represented examples, it is possible to design the burners as line burners or ring burners. One then obtains nearly unchanged conditions within the combustion chambers.

Scale-up for technical fixtures is surprisingly easy, based on the technical teaching for the dimensioning of pore burners, in particular with the previously described adiabatic process control, according to which defined flow conditions must be maintained in Zones A and C, independent of construction size.

The pore burners described in the following, which have been modified for chemical processes, are components of technically engineered facilities for the manufacture of hydrochloric acid or for after-combustion of chlorine-containing compounds. Such plant presents, for example, a modified pore burner, a heat exchanger for the cooling of the reaction products and/or for exploitation of thermal contents and, depending upon the type of facility, it also has an absorber, a scrubber or exhaust gas washer at transitional pieces between the apparatuses, pumps, pipe lines and the conventional safety, measuring and control devices.

Based on execution of reaction and good through-mixing of gases in the pore burner, no voluminous combustion chamber is needed, compared with the state of the art. The burner can be directly connected with the succeeding apparatuses, for example a heat exchanger, a quenching unit with absorber or other apparatuses. Following cool-down of the reaction products streaming from the burner in a heat exchanger or after a quenching unit, a partial stream of the cooled-down gas and/or gas mixture is again supplied to the burner, as described above. Alternatively, as described, another gas can also be added, for example water vapor.

Depending upon the requirements of the product, only portions of the process-engineered facility might be needed, for example burner and gas cooler or burner and quenching unit, depending upon whether the product is needed in the form of gas or dissolved in water as hydrochloric acid.

Another specific embodiment of a facility for production of hydrochloric acid uses carburetted hydrogen gas as supplier of hydrogen, for example natural gas, methane, propane, etc., chlorine and air. Combustion then takes place according to reaction equations 1 and 2) depicted in highly simplified fashion:

$$CH_4+O_2+Cl_2 \rightarrow CO+2HCl+H_2O \quad (1)$$

$$CO+1/2O_2 \rightarrow CO_2 \quad (2)$$

This combustion is difficult to perform in facilities according to the state of the art, since carbon black may be formed under unfavorable conditions, which will dirty up the facility and the acid. The described particular properties of the pore burner make possible, and rather unexpectedly, stable, soot-free combustion for this critical application.

Pore burners for the after-combustion of halogen-containing exhaust gases of evaporable or gaseous halogen-containing organic compounds are performed, as will later be explained in more detail later on, in that oxidants and combustion gases, preferably pre-mixed, are blown into the pre-mix chamber. Due to the high reaction enthalpy of oxidants and combustion gas, a stable support flame is generated in the combustion Zone C. The subsequently to be burned gas or gas mixtures is blown by means of an intake pipe into the pre-mix chamber, preferably via a grate from Zone A of the pore burner and is mixed with the fuel/oxidant mixture. For control of temperature of the after-combustion process one preferably utilizes a corresponding surplus of the oxidant, in particular air. For control of the temperature in Zone C of the pore burner, the temperature is measured with an infra-red pyrometer, for example, and the signal for the oxidant control is processed further. Down-stream devices for after-combustions differ from the above described components, depending upon halogen contents of exhaust gases. With small halogen content, where preparation of hydrochloric acid is not the first priority, generally only a quenching unit and a washer is arranged down-stream. Other by-products, such as sulphur compounds and similar can likewise be subjected to non-harmful elimination. Inasmuch as the after-combustion fixtures with pore burners do not require a combustion chamber in the traditional sense, it is possible to design such facilities in highly compact size and at favorable cost.

The following preferred improvements of the invention result on the basis of the preceding detailed explanations:

- the burner has at least two zones with material of different pore size, between which the pore size provides the critical Péclet number;
- the material with coherent hollow spaces presents, at least in part, bulk volume of bodies, as utilized for solid body bulk volume or orderly packings in thermal separation processes, such as spheres or shell bodies;
- at the border area for zones of differing porosity is provided a grid or a grate in order to avoid discharge of bodies from one zone into the other, whereby the grid, in particular the grate, may also be cooled;
- the combustion chamber is designed for flame stability with over- and under-pressure.

The combustion chamber can now also be designed for flame stability with over- or under-pressure, which would have lead in the formerly known state of the art to only insufficient flame stability. Based on the invention and its improvements there is now available a significantly larger pressure range, so that a corresponding design for a larger pressure range may result in significant increase in flame stability in a fashion known to a person skilled in the art, specifically also with respect to over- or under-pressure. Controls can thus largely be eliminated.

In particular, in a preferred improvement of the invention, provision is made for a combustion chamber insulation for a nearly adiabatic combustion control without wall effects. An adiabatic combustion control is particularly beneficial for increasing the reaction rate. Detrimentally, said adiabatic combustion control without wall effects was completely impossible with the aforementioned burners.

In addition to combustion, it is also possible to obtain reaction products, for example with the hydrochloric acid combustion of hydrochloric acid synthesis. To that end, for a preferred improvement of the invention, it is provided that the fixture has a device for obtaining or for separating the reaction products from the combusted fuel/oxidant. In particular, with respect to the hydrochloric acid synthesis, provision is made that the device is designed for a chlorine-containing compound in the fuel as well as hydrogen in the oxidant for combustion of the hydrochloric acid and that it has, for that purpose, a process-engineered device for obtaining hydrochloric acid or muriatic acid behind the combustion chamber. The cited design is known to the expert. In particular, notice should be taken that the corresponding safety devices are taken into account and that the materials have the appropriate corrosion resistant properties vis-a-vis chlorine.

As has been outlined above, the invention cannot only be used for hydrochloric acid synthesis, but also as device for after-combustion of exhaust gases, and in particular for cleaning purposes. Thus it is for example possible with respect to some of the exemplary embodiments represented in the description which follows to undertake, without any problem, after-combustion of portions of organic compounds and to thus harmlessly dispose of same.

BRIEF DESCRIPTION OF THE DRAWINGS

Further measures and particular features of the invention become apparent from the description of the exemplary embodiments which follow, making reference to the appended drawing.

DETAILED DESCRIPTION

For the following exemplary embodiments, a special type of burner was selected, i.e. the previously already more thoroughly discussed pore burner 1, which presents particular benefits in comparison with other burner types. The essential characteristic of the invention consists in that the flame is cooled by supply of an additional gas to the fuel/oxidant mixture, which can be realized with respect to all conceivable burner types.

Figure 1:
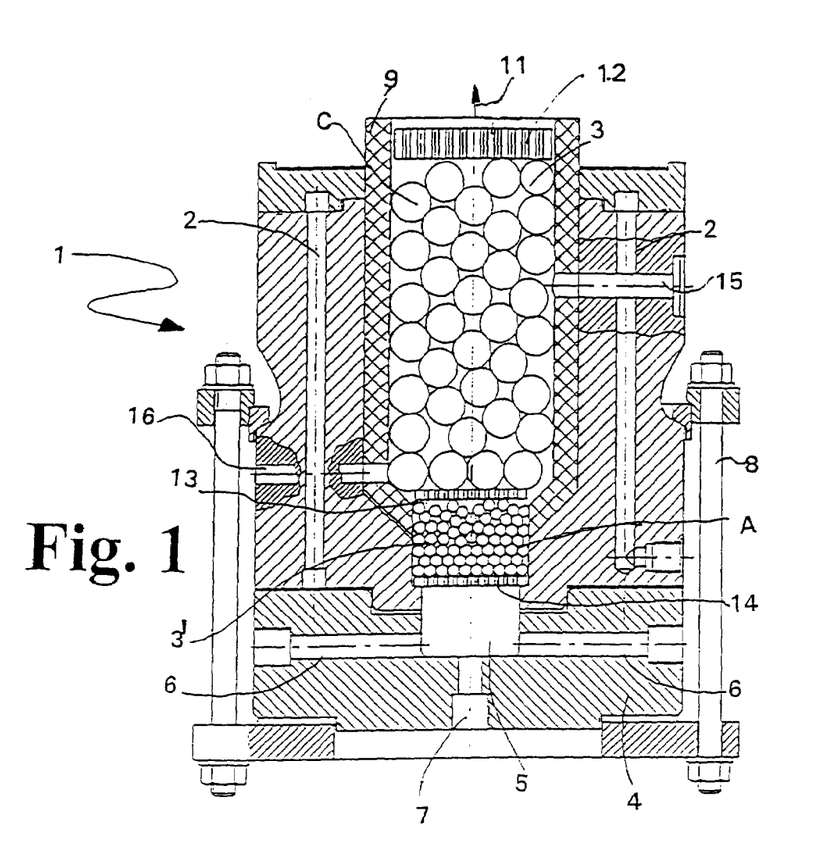
FIG. 1 depicts a pore burner of artificial resin-impregnated graphite with borings for water-cooling at the graphite casing.

Therefore, the description of exemplary embodiments which follows is not to be regarded as limitation on the basis of pore burner 1 alone. A general exemplary embodiment of a pore burner 1 for chemical processes is represented in FIG. 1.

The housing of pore burner 1 consists of artificial resin-impregnated graphite and is traversed by cooling channels 2, which transport cooling agents, for example, cooling water.

In addition, two zones are depicted, Zone A and C, defined by sphere-shaped filling bodies. Zone C acts as combustion zone in which the flame develops. By appropriate dimensioning, ignition is avoided in Zone A. The combustion zone C is filled for that purpose with larger sphere-shaped filling bodies 3—Zone A, on the other hand, is filled with smaller sphere-shaped filling bodies 3'.

Figure 3:
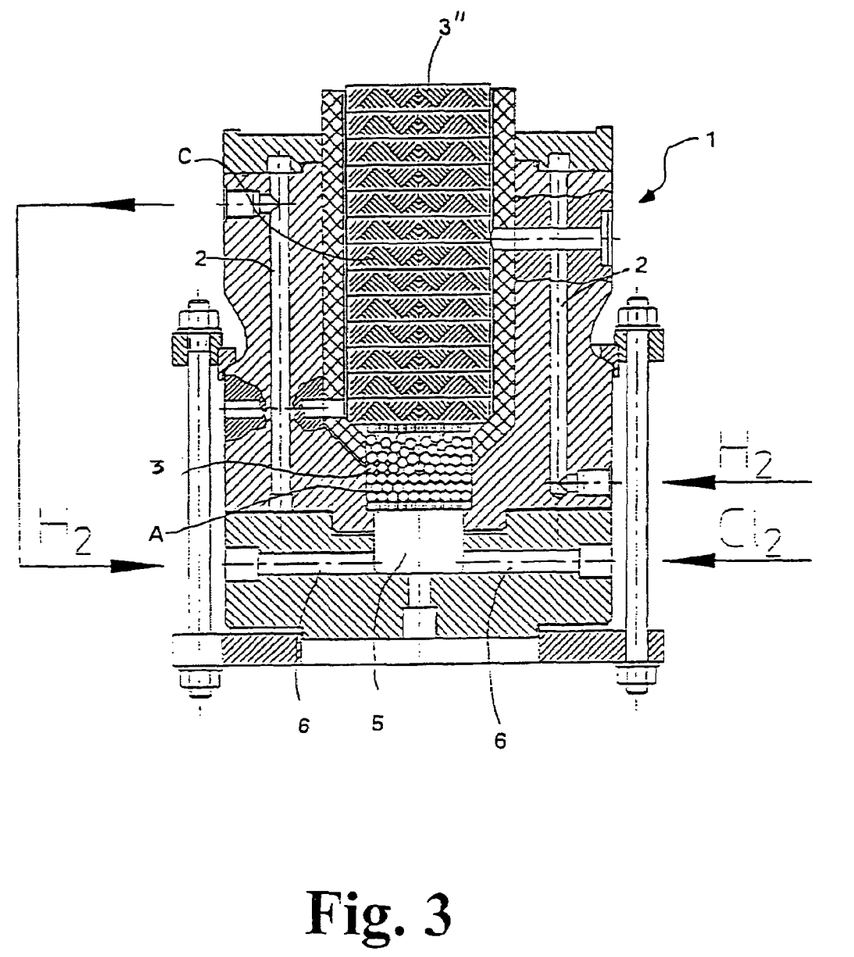
FIG. 3 depicts a pore burner according to FIG. 1 with casing cooled by the combustion gas and orderly packing of combustion chamber filling.

In a lower section are gas inlet channels 6, which issue tangentially into the pre-mix chamber 5, as is depicted, in detail, in FIG. 3a. Due to the tangential supply, effective mixing takes place by means of swirling.

Figure 1A:
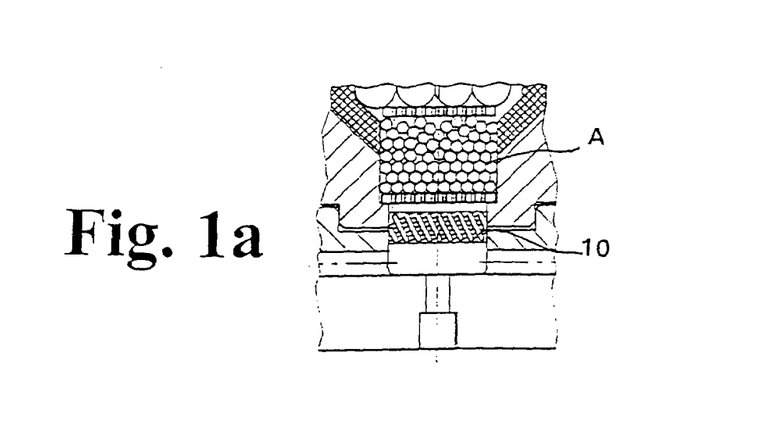
FIG. 1a depicts a section of a pore burner according to FIG. 1, but with static mixing elements in the pre-mix chamber.

In addition, a condensate outlet 7 is provided at the pre-mix chamber whose position—depending upon the installation position of burner 1, is established in downward direction, so that the condensate is able to run off. The pre-mix chamber 5 can, furthermore, contain, depending upon need, static mixing elements 10, as they can be seen in detail in FIG. 1a, as segment of FIG. 1.

In order to simplify cleaning, the lower portion 4 is detachably attached at the housing of pore burner 1 by means of an attachment device 8.

In order to achieve an essentially adiabatic combustion, the combustion chamber C is thermally screened off against the cooled housing wall of the pore burner 1 by means of a ceramic insulation 9.

At the gas exit 11, the combustion chamber C is topped with a grate 12, which prevents that filling bodies can fall out of the pore burner 1 in case of other than vertical installation.

Another grate 13 between the Zones A and C prevents that small filling bodies of Zone A are blown into the intermediate spaces of the filling bodies of Zone C. Grate 14, which can likewise be seen in FIG. 1, separates the pre-mix chamber 5 from Zone A. In the combustion chamber wall of pore burner 1 and the isolation 9, a continuous opening 15 is provided for measuring the temperature and an opening 16 in order to ignite the mixture. In order to lower the flame temperature to less than maximum temperature, at which temperature the spheres will not melt, an additional gas is supplied to the pre-mix chamber, such as water vapor, exhaust gas from the combustion or another type of gas.

Figure 2:
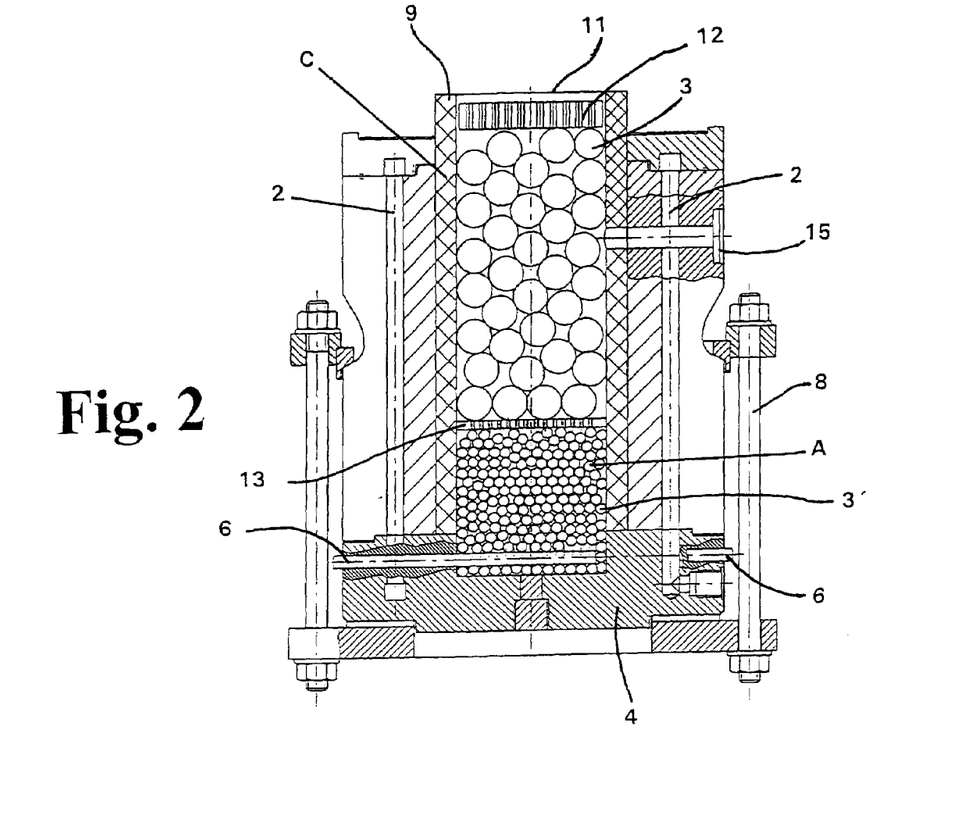
FIG. 2 depicts a pore burner as in FIG. 1, but without pre-mix chamber.
Figure 2A:
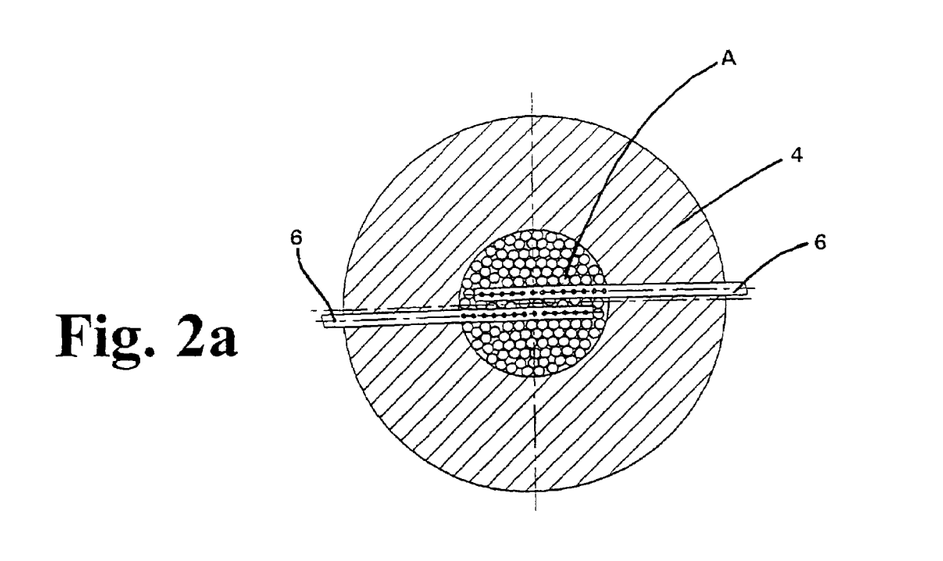
FIG. 2a depicts a section through Zone A of the burner according to FIG. 2 for illustration of the mixture.

FIG. 2 depicts a pore burner, which operates in the same manner as the burner of FIG. 1. In contrast to the burner of FIG. 1, no pre-mix chamber is provided here. The gases are introduced by means of lines 6 directly into Zone A. Pervasion of spaces between the spheres 3' leads to highly uniform distribution, so that the gases introduced into Zone A via supply line 6 mix with one another very well. As is apparent from FIG. 2a, the supply lines 6 present a multitude of holes, which mainly take care of uniform distribution at the bottom of the pore burner and, if dimensioned sufficiently small, can prevent flame backfire into lines 6.

In addition, two of the combustion gases, for example $Cl_2$ and $H_2$ are carried in separate lines 6, which are laterally at a distance from Zone A and are introduced from opposite sides, so that no accidental mixing can take place in the proximity of the principal supply, for example due to leaks, which might lead to an explosion, somewhere.

FIG. 3 depicts another specific embodiment, in which the combustion gases themselves provide for cooling and corresponding heat transfer. The hydrogen is initially conducted for that purpose through cooling channels of the combustion chamber wall of pore burner 1, before entering through an inlet channel 6 in the under-section 4 into the pre-mix chamber, as is indicated by arrows on the left and right hand side of FIG. 3. The chlorine enters through another gas inlet channel 6. An outside gas is blown into the pre-mix chamber 5 through additional gas inlet channels 6, as can be seen in detail in FIG. 4a. In this specific embodiment, the design of the insulation should be adapted to the heat absorption capability of the hydrogen.

In this example, the combustion chamber C is filled with a structured packing 3", by means of which there is improvement in the mixing of the reaction partners compared with the sphere packing according to FIG. 1. Such packings 3" are particularly appropriate for those instances where no solid substances are contained in the gases, such as carbon black.

Figure 4:
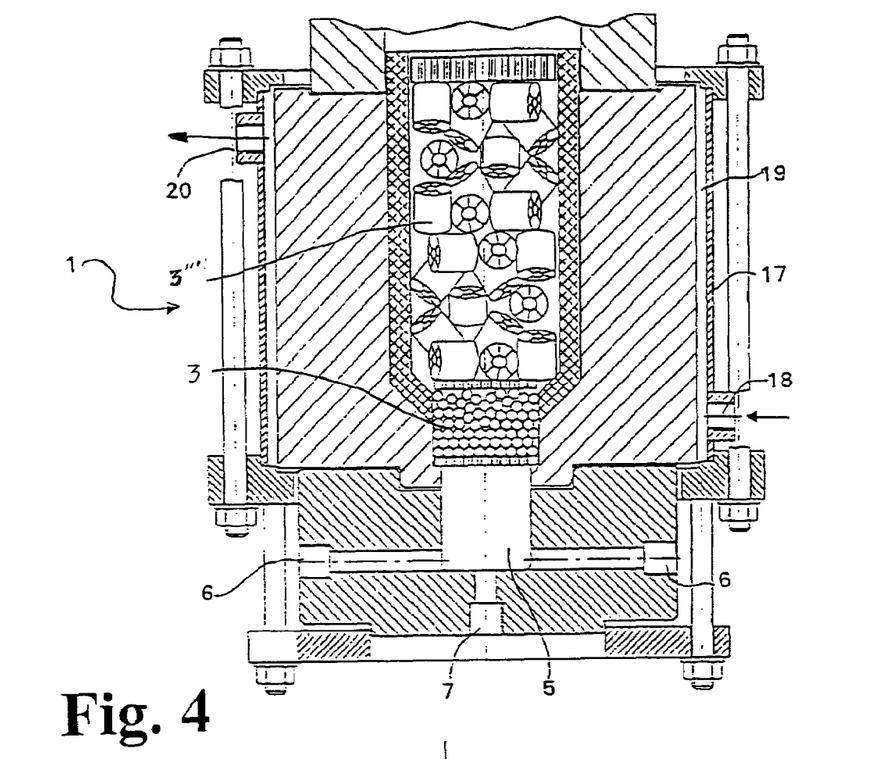
FIG. 4 depicts a pore burner with a cooling casing made of steel.

FIG. 4 depicts another exemplary embodiment of a pore burner 1, which is encased by a graphite wall, which is surrounded by a water-cooled casing 17 of steel. The graphite wall of the pore burner 1 does not need, in this case, any interior cooling channels because of the high thermal conductivity of carbon.

The cooling water enters at the stub 18 into the casing space 19 of the steel casing 17 and leaves same again through a stub 20. The pore burner represented in FIG. 4 is equipped with ceramic fill body rings 3''' (to demonstrate another design relative to Zone 5)—said rings present a cylindrical shape with inner structures. By means of such structures, the surface is raised, mainly relative to the example of FIG. 1.

Figure 4A:
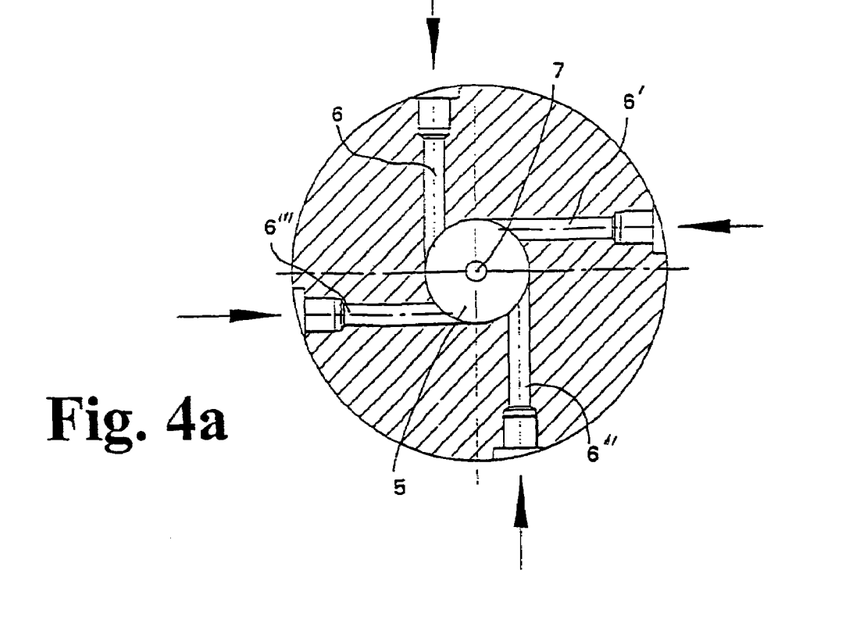
FIG. 4a depicts a section through the pre-mix chamber with tangential entry stub for the gases.

FIG. 4a depicts, by way of example, the location of the entry stub 6 for the pre-mix chamber 5. Combustion gases and inert gases are preferably supplied to peripherally consecutive entry stubs 6, in order to lower the flame velocity of the mixtures, for example hydrogen at 6', chlorine at 6" and circulating gases at 6'''. Condensates can exit from the pre-mix chamber at stub 7.

Figure 5:
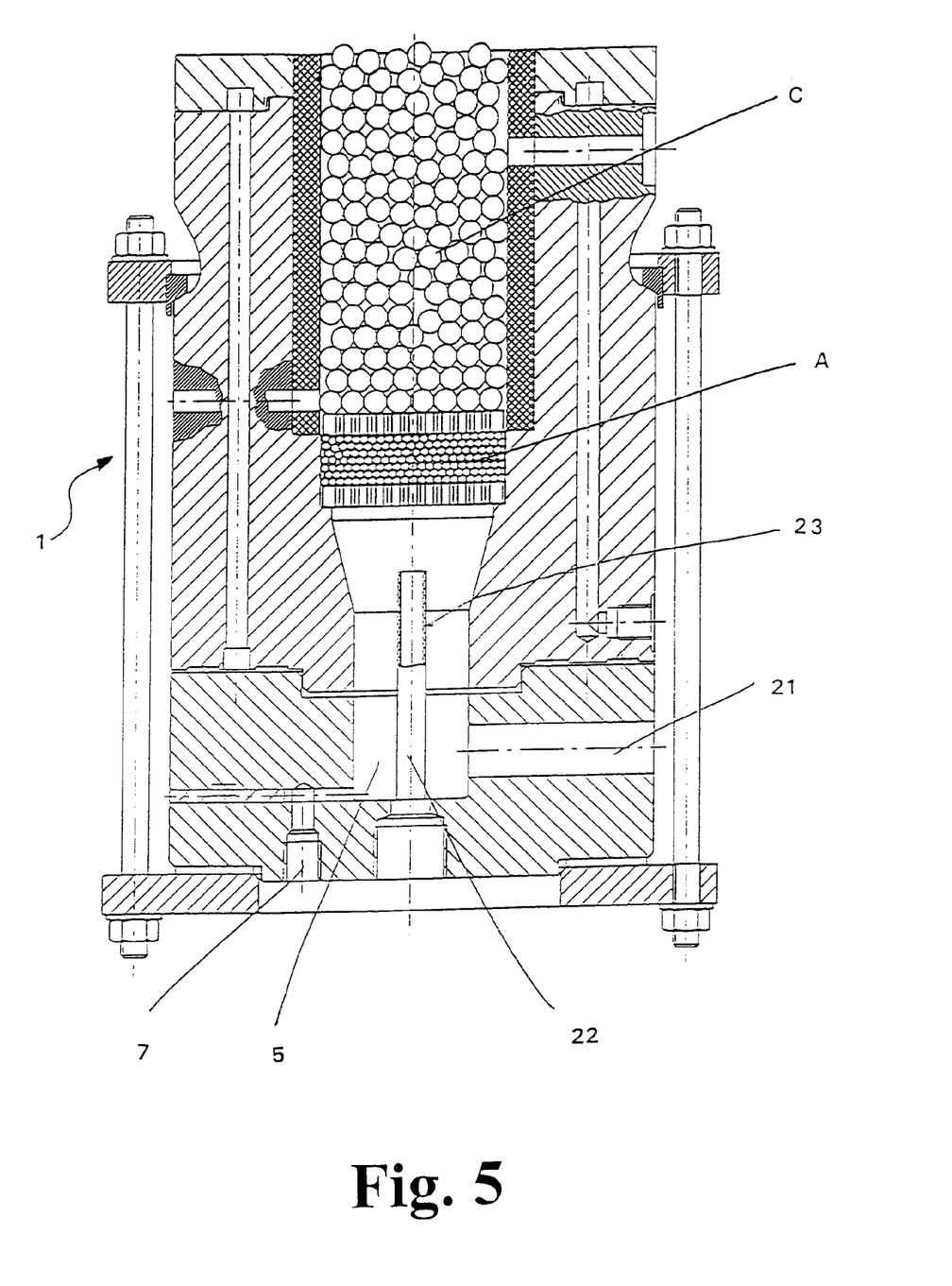
FIG. 5 depicts a pore burner for after-combustion of exhaust gases by means of a fuel gas/air mixture.

FIG. 5 shows a pore burner 1 for after-combustion of chlorine-containing gases. It differs from the in FIG. 1 described specific embodiment by a modified pre-mix chamber 5, into which issues a generously dimensioned gas entry channel 21, through which flow the pre-mixed gases, air as oxidant and fuel. A gas inlet pipe 22, through which is conducted the subsequently to be combusted exhaust gas, also projects into the pre-mix chamber 5. The gas inlet pipe 22 is fitted with borings 23 at its casing surface, through which the exhaust gas to be subsequently combusted, enters into the pre-mix chamber 5 and mixes with the fuel gas stream which flows around the pipe. The condensate outlet 7 is in this case laterally arranged, in contrast to the representations of FIGS. 1-3. The pre-mix chamber 5 widens below Zone A to the same cross-section as the one of Zone C. Said widening affords an increase in the possible gas load of the burner.

Figure 6:
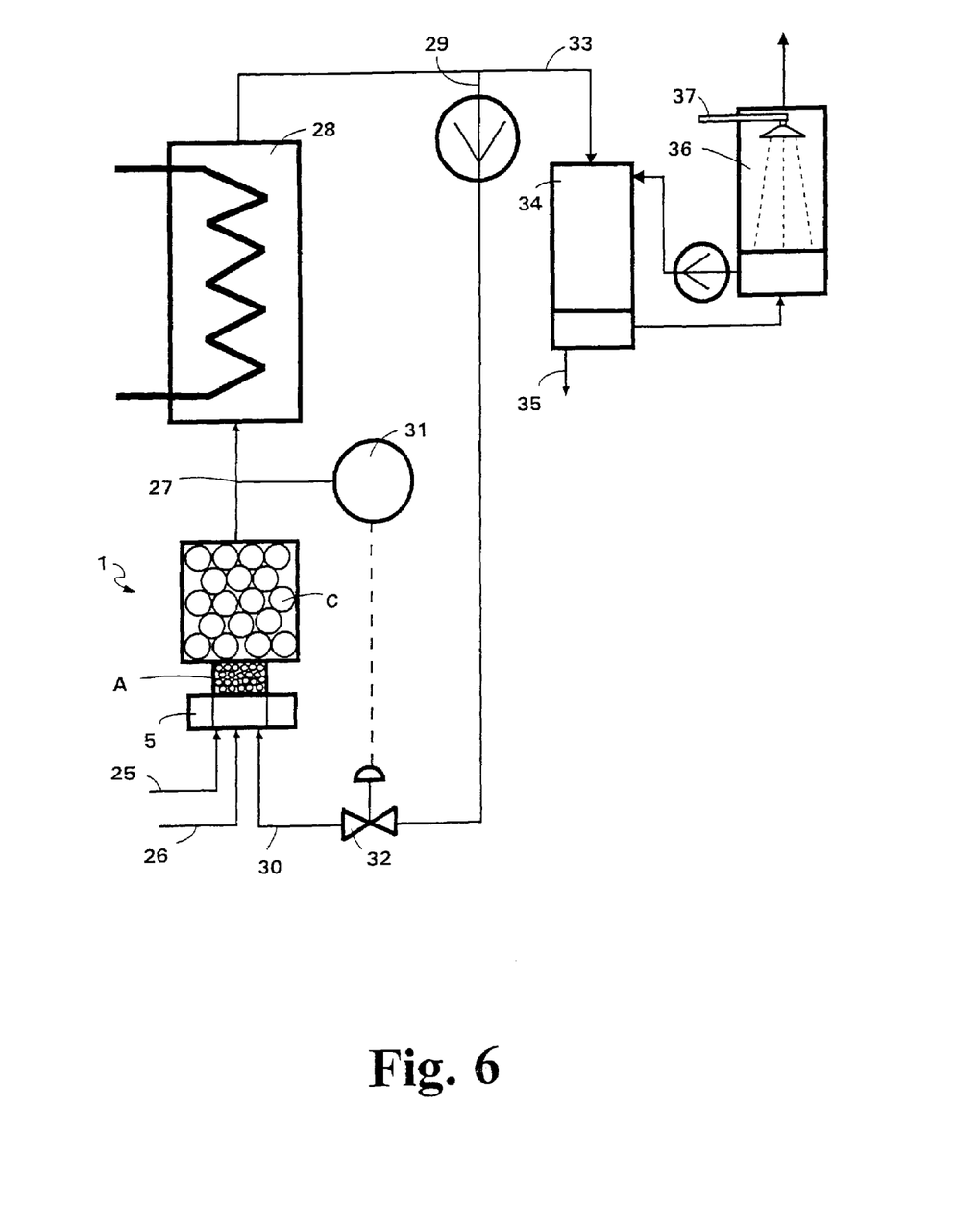
FIG. 6 depicts a process-engineered facility for production of hydrochloric acid with pore burner, heat exchanger, absorber, scrubber and product return.

FIG. 6 depicts a simplified diagram of a facility for the production of hydrochloric acid, into which is integrated a pore burner 1, for example of the type according to FIG. 3. The combustion gases, hydrogen and chlorine are in this arrangement fed into a pore burner 1 via supply lines 25, 26. The reaction products get from the pore burner via a line 27 into a heat exchanger 28 for cool-down. The heat exchanger can be cooled, for example, with cooling water. Alternatively, however, heat utilization is also possible in that hot water or low pressure steam is generated there for further utilization.

From the cooled-down gases exiting from the heat exchanger, a portion is segregated via a line 29 and passed to the fuel/oxidant mixture via a supply line 30 in front of the burner. Temperature regulation takes place by means of a corresponding measuring station 31 and a temperature-controlled valve 32.

The other portion of the gases gets, via a line 33, into a drop foil absorber 34, for example, in which hydrochloric gas is absorbed in water or diluted muriatic acid and withdrawn from the stub 35. The washer, designed here as drop foil absorber 34, can be operated by direct current, as represented, or also by opposite current. The non-absorbable and insignificant portions of hydrochloric gas then get into an after-wash unit 36, in which the remaining portions of hydrochloric gas are washed out by means of fresh water supplied via line 37. The washing water enriched with hydrochloric gas is beneficially utilized as absorption liquid for the absorption unit and returned for that reason.

Figure 7:
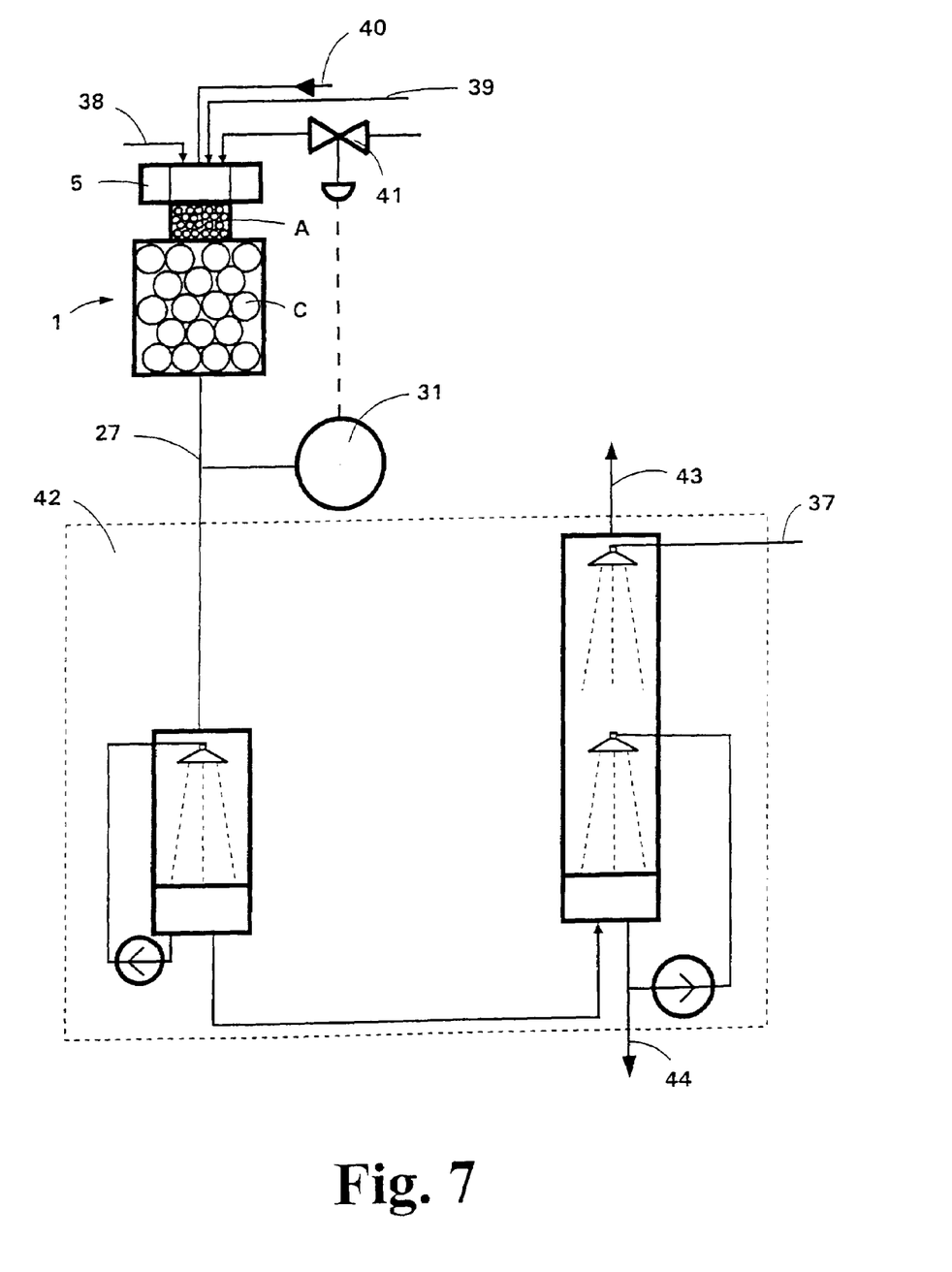
FIG. 7 depicts a process-engineered facility for after-combustion of chlorine-containing or chlorinated hydrocarbon-containing exhaust gases with pore burner, quenching unit and washing unit.

FIG. 7 depicts another schematic representation of a facility which can be employed, for example, for post-combustion of chlorine-containing compounds and exhaust gases having low chlorine contents from other fixtures or components of fixtures.

An exhaust gas with chlorine-containing components supplied via a line 40 is post-combusted in a pore burner 1 by means of a support flame from natural gas and air supplied via lines 38 and 39. The combustion temperature of the pore burner 1 is controlled in this example with the aid of additional air via a valve 41, if the cooling effect of the subsequently to be combusted gas supplied via line 40 is insufficient, or if it has a heating value that needs to be considered. Needless to say, other gases, for example inert gases or steam, can also be supplied for regulation of temperature, if the extreme parameters so require. If the combustion temperature is lower than the specified target value, the heat output needs to be increased by supply of natural gas.

The exhaust gases can be passed to an exhaust heat exploitation unit in a heat exchanger not represented here, or they can be quenched directly as is frequently the case with small facilities. After quenching, the chilled gases reach a washer 42, in which the exhaust gases are initially washed with circulating fluid, then with fresh water supplied via line 37. A portion of the wash water is subjected to further processing. This, however, is not indicated in the drawing.

The purified exhaust gas escapes from a line 43, while diluted hydrochloric acid can be removed via a line 44.

The particular benefits of a pore burner 1 in such plants are based on its outstanding capability of regulating the combustion temperature and in its combustion stability. The stabilizing effect of the hot ceramic materials in Zone C has a positive effect upon any sudden changes in the composition of the subsequently to be combusted exhaust gas. The other combustion parameters, such as natural gas and air requirement for maintaining the target temperature in the combustion zone can quickly be adapted without interrupting the combustion. Combustion temperatures of up to 1600° C. are possible with commercially available ceramic oxide aggregate.

Results of Testing the Described Method and Devices utilized therefor:

EXAMPLE 1

Hydrochloric acid was produced from hydrogen (1.12 $m^3/h$) and chlorine (1.09 $m^3/h$) with a pore burner 1 according to FIG. 1. In a process-engineered pilot plant according to FIG. 5. a stream of inert gas stream was blown in as added gas for lowering the flame temperature, also 0.73 kg/h of steam was added into the pre-mix chamber. With a stoichiometric hydrogen surplus of 3%, a free chlorine contents of less than 3% was ascertained in the 30% (by weight) hydrochloric acid, which was produced by combustion.

EXAMPLE 2

An exhaust gas containing methyl-chloride was subjected to post-combustion in a pore burner 1 according to FIG. 5, in a plant according to FIG. 7, in a support flame of 0.17 $m^3$ natural gas and 1.54 $m^3/h$ air. A post-combustion gas with approximately 0.1% methyl chloride in air was introduced as exhaust gas with 0.35 $m^3/h$. The temperature of the exhaust gas escaping from the pore burner was at approximately 1100° C. The contents of methyl chloride in the exhaust gas was less than 12 ppm.

EXAMPLE 3

The following results were obtained in a test using a plant according to FIG. 6 and a pore burner according to FIG. 1: Combustion of 0.12 $m^3/h$ chlorine with 0.2 $m^3/h$ natural gas (methane) and 2.8 $m^3/h$ air. Hydrochloric acid (30%) free from carbon black was produced. Contents of carbon monoxide was smaller than 0.5%. By-products such as polychlorinated dioxins and furans could not be ascertained in the acid nor in the exhaust gas. Chlorine contents in the acid was less than 50 ppm.

Subject to unfavorable parameters, the exhaust gas with high air excess could once more be subjected to after-combustion in a device according to FIG. 5.

EXAMPLE 4

In addition, tests were performed at greatly reduced combustion chamber temperature in a burner according to FIG. 1. Using 1.06 $m^3/h$ hydrogen, 1.04 $m^3/h$ chlorine and 1.02 kg/h steam, even with low combustion chamber temperature of approx. 600° C., there resulted only low chlorine contents in the obtained acid of less than 3 ppm.

As demonstrated by these examples, the above named burner types make it possible to basically execute, in simple fashion, highly exothermal chemical reactions, in low volume scale as well as in adiabatic manner. Safety provisions can easily be maintained. Thus, the burner type described here proves itself in all requirements vastly superior for highly exothermal chemical reactions when compared with the traditional burners.

The invention claimed is:

1. Device comprising:
   a burner that provides for combustion of a fuel/oxidant mixture, having a combustion temperature above 2500° C., within a combustion chamber at a temperature below said combustion temperature;

a material which endures a maximum temperature that is less than the combustion temperature of said fuel and said oxidant, said material being provided in said combustion chamber;

supply lines for the fuel as well as the oxidant, in order to conduct these into the combustion chamber;

at least one additional supply line connected to a low combustion value gas supply in order to conduct a low combustion value gas into the combustion chamber that allows the temperature during combustion to be lowered to a value below the maximum temperature; and a pre-mix chamber that provides for mixing of said fuel and oxidant, wherein said fuel and oxidant are added to said pre-mix chamber separately by means of tangentially arranged supply lines, and wherein said material is a porous material with inter-connected hollow spaces suitable in size for flame development.

2. Device according to claim 1, wherein a combustion product from the combustion chamber is introduced, at least in part, via a supply line as additional gas, by means of which the temperature can be lowered during combustion.

3. Device according to claim 1, wherein the pre-mix chamber includes static mixing elements and is designed in such manner that in the direction towards the combustion chamber, the flow velocity component of the mixture is greater in the pre-mix chamber than the flame velocity in the combustion chamber.

4. Device according to claim 1, wherein the pre-mix chamber is also supplied with additional gas by means of which the combustion temperature can be lowered, so as to mix said additional gas with the fuel/oxidant mixture.

5. Device according to claim 1, wherein the size of a lateral surface of a side wall of the pre-mix chamber in proportion to the volume of the pre-mix chamber is selected in such manner that the side wall is able to accommodate free energy from detonation of gases in the pre-mix chamber.

6. Device according to claim 1, wherein the pre-mix chamber is cooled.

7. Device according to claim 1, wherein said porous material with inter-connected hollow spaces has a porosity that changes over to larger pores in the direction toward the development of flame, with resulting critical Péclet number for the pore size at an inner border area, above which flame development takes place and below which flame development is suppressed.

8. Device according to claim 7, wherein the combustion chamber has at least two zones with material of differing pore size, between which, pore size provides the critical Péclet number.

9. Device according to claim 1, wherein the material with inter-connected hollow spaces presents, at least in part, bulk volume of bodies.

10. Device according to claim 9 having a border area for zones of differing porosity comprised of a material of differing pore size, between which, pore size provides the critical Péclet number, wherein a grid is provided at the border area, in order to prevent discharge of the bodies from one zone into the other.

11. Device according to claim 10, wherein the grid is cooled.

12. Device according to claim 1, wherein the at least one additional supply line is in communication with the combustion chamber to deliver the low combustion value gas into the combustion chamber to mix the low combustion value gas with the fuel and the oxidant.

13. Device according to claim 1, wherein said device is a reactor vessel for synthesis of hydrochloric acid, said fuel includes a chlorine-containing compound and said oxidant includes hydrogen.

14. A system for combustion of a fuel/oxidant mixture comprising:
a combustion chamber;
a material, which endures a maximum temperature lower than a combustion temperature of said fuel and said oxidation agent provided in said combustion chamber;
a pre-mix chamber disposed upstream from an in communication with an inlet of the combustion chamber;
separate supply lines in tangential communication with the pre-mix chamber that supply at least one of fuel and an oxidation agent, in order to conduct these into the combustion chamber;
a low combustion value gas supply; and
an additional supply line in communication with the low combustion value gas supply and the pre-mix chamber for introducing a low combustion value gas into the combustion chamber to mix with the at least one of fuel and an oxidation agent to allow the temperature during combustion to be lowered below the maximum temperature, wherein said system is less than one meter in length, and wherein said material is a porous material with inter-connected hollow spaces suitable in size for flame development.

15. The system of claim 14, wherein the low combustion value gas supply includes an outlet line in communication with an outlet of the combustion chamber.

16. The system of claim 15, wherein the outlet line is in communication with an inlet of a heat exchanger and the outlet of the heat exchanger is in communication with the additional supply line.

17. The system of claim 14, wherein the low combustion value gas supply comprises at least one of an inert gas source and a steam source.

18. Device according to claim 14, wherein said device is a reactor vessel for synthesis of hydrochloric acid, said fuel includes a chlorine-containing compound and said oxidation agent includes hydrogen.

19. A system for combustion of a fuel/oxidant mixture comprising:
a combustion chamber in which a material is provided which endures a maximum temperature, the combustion chamber having an inlet and an outlet;
a pre-mix chamber disposed upstream from and in communication with the inlet of the combustion chamber;
separate supply lines in tangential communication with the pre-mix chamber that supply at least one of fuel and an oxidation agent to conduct these into the combustion chamber;
a low combustion value gas supply; and
an additional supply line in communication with the low combustion value gas supply and the pre-mix chamber for introducing a low combustion value gas into the combustion chamber that allows the temperature during combustion to be lowered below the maximum temperature, wherein said maximum temperature is lower than a combustion temperature of said fuel and said oxidation agent, and wherein said material is a porous material with inter-connected hollow spaces suitable in size for flame development.

20. Device according to claim 19, wherein said device is a reactor vessel for synthesis of hydrochloric acid, said fuel includes a chlorine-containing compound and said oxidation agent includes hydrogen.

21. A combustion system, comprising:
a combustion chamber, for the combustion of a mixture below said mixture's combustion temperature, having an inlet, an outlet, a first chamber region, and a second chamber region intermediate said first chamber region and said inlet;
a first porous material, disposed in said first chamber region, a pore size of which first porous material permits flame formation;
a second porous material, disposed in said second chamber region, a pore size of which second porous material retards flame formation;
a mixing chamber disposed upstream from and in communication with said inlet;
a first supply line that feeds a first gas stream comprising a fuel directly into said mixing chamber;
a second supply line that feeds a second gas stream comprising an oxidation agent directly into said mixing chamber; and
a low combustion value gas supply line that supplies a low combustion value gas to said mixing chamber via said first supply line and/or said second supply line, wherein
said first and second gas supply lines are tangentially arranged to said mixing chamber,
said first porous material and said second porous material are chosen such that a combustion temperature of said fuel and oxidation agent exceeds the lower of a maximum temperature that said first porous material can withstand and a maximum temperature that said second porous material can withstand, and
said first porous material and said second porous material are chosen such that a combustion temperature of a resultant mixture of said fuel, said oxidation agent and said low combustion value gas in said mixing chamber is less than said maximum temperature that said first porous material can withstand and less than said maximum temperature that said second porous material can withstand.

22. The system of claim 21, wherein
said first supply line feeds said first gas stream into said mixing chamber at a first location, and
said second supply line feeds said second gas stream into said mixing chamber at a second location that is spaced from said first location.

23. The system of claim 21, wherein
said low combustion value gas is water vapor, an exhaust gas resulting from combustion of said mixture or an inert gas with respect to said combustion.

24. The system of claim 21, wherein said system is a reactor for synthesis of hydrochloric acid, said fuel includes a chlorine-containing compound and said oxidation agent includes hydrogen.

25. A combustion system, comprising:
a combustion chamber, for the combustion of a mixture below said mixture's combustion temperature, having an inlet, an outlet, a first chamber region, and a second chamber region intermediate said first chamber region and said inlet;
a first porous material, disposed in said first chamber region, a pore size of which first porous material permits flame formation;
a second porous material, disposed in said second chamber region, a pore size of which second porous material retards flame formation;
a mixing chamber disposed upstream from and in communication with said inlet;
a first supply line that feeds a first gas stream comprising a fuel directly into said mixing chamber;
a second supply line that feeds a second gas stream comprising an oxidation agent directly into said mixing chamber;
a third supply line that feeds a third gas stream directly into said mixing chamber; and
a low combustion value gas supply line that supplies a low combustion value gas to said mixing chamber via one or more of said first supply line, said second supply line and said third supply line, wherein
said first, second, and third gas supply lines are tangentially arranged to said mixing chamber,
said first porous material and said second porous material are chosen such that a combustion temperature of said fuel and oxidation agent exceeds the lower of a maximum temperature that said first porous material can withstand and a maximum temperature that said second porous material can withstand, and
said first porous material and said second porous material are chosen such that a combustion temperature of a resultant mixture of said fuel, said oxidation agent and said low combustion value gas in said mixing chamber is less than said maximum temperature that said first porous material can withstand and less than said maximum temperature that said second porous material can withstand.

26. The system of claim 25, wherein
said first supply line feeds said first gas stream into said mixing chamber at a first location,
said second supply line feeds said second gas stream into said mixing chamber at a second location that is spaced from said first location, and
said third supply line feeds said third gas stream into said mixing chamber at a third location that is spaced from both said first location and said second location.

27. The system of claim 25, wherein
said low combustion value gas is water vapor, an exhaust gas resulting from combustion of said mixture or an inert gas with respect to said combustion.

28. The system of claim 25, wherein said system is a reactor for synthesis of hydrochloric acid, said fuel includes a chlorine-containing compound and said oxidation agent includes hydrogen.

* * * * *